Patented Aug. 26, 1941

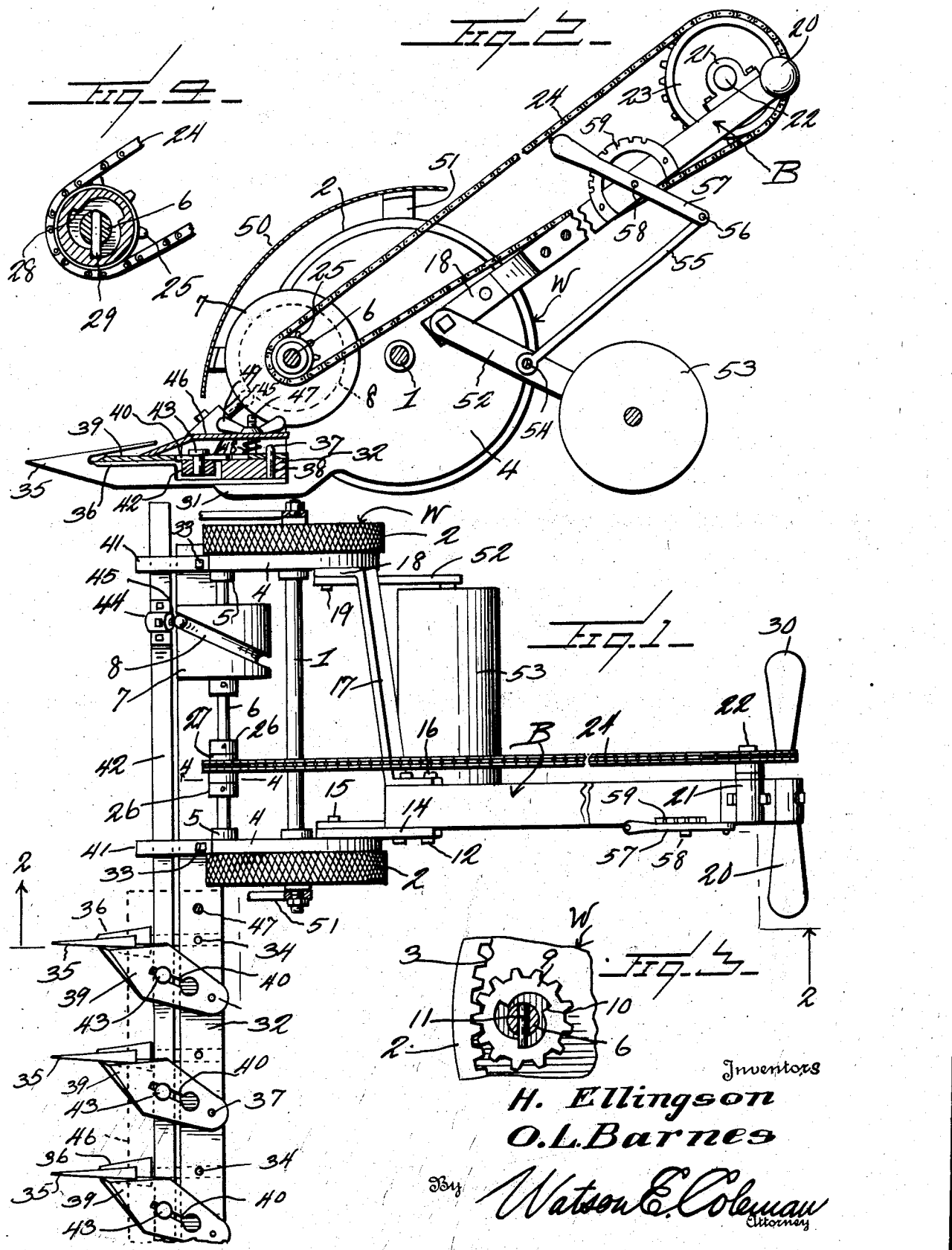

2,253,900

UNITED STATES PATENT OFFICE 2,253,900

LAWN MOWER

Hans Ellingson and Oscar L. Barnes,
Hamilton, Ohio

Application April 23, 1940, Serial No. 331,220

7 Claims. (Cl. 56—242)

This invention relates to lawn mowers, and it is primarily an object of the invention to provide a mower of this kind which will effectively cut any length of grass on a level, on a hill, or on rough ground.

The invention also has for an object to provide a mower embodying a reciprocating cutter bar together with means whereby said bar may be operated from a ground engaging wheel for the mower or whereby when desired said bar may be manually operated.

A further object of the invention is to provide a mower of this kind including a reciprocating bar together with means whereby cutter blades may be detachably mounted upon said bar with a further means for effecting desired tension between the cutters on the bar and the blades carried by the guards.

The invention consists in the details of construction and in the combination and arrangement of the several parts of our improved lawn mower whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:

Figure 1 is a view in top plan with portions broken away of a mower constructed in accordance with an embodiment of our invention;

Figure 2 is a sectional view taken substantially on the line 2—2 of Figure 1 looking in the direction of the arrows;

Figure 3 is a fragmentary view partly in section and partly in elevation illustrating the driving connection between one of the ground engaging wheels and the operating shaft of the mower;

Figure 4 is a detailed sectional view taken substantially on the line 4—4 of Figure 1.

As illustrated in the accompanying drawing, the ground engaging wheels W are mounted for rotation upon the opposite end portions of the axle 1. These wheels W each has its periphery defined by an inwardly disposed tread flange 2, the inner face of which is formed to provide a continuous annular gear rack 3.

Associated with the inner sides of the wheels W are the side plates 4 and these side plates 4 in the lower forward portions thereof are provided with the bearings 5 which provide mountings for the opposite end portions of the shaft 6.

This shaft 6, as clearly illustrated in the accompanying drawing, bridges the space between the side plates 4 and fixed to said shaft 6 for rotation therewith is a relatively broad pulley 7 provided in its periphery with a continuous cam groove 8 extending around the pulley 7 at a desired angle with respect to the axis of the pulley.

Each end portion of the shaft 6 extends inwardly of the flange 2 of the adjacent wheel W and freely mounted on said extended portion of the shaft 6 is a pinion 9 meshing with the rack 3 of the flange 2. The central opening of the pinion 9 is formed to provide a series of internal ratchet teeth 10 and freely inserted through the portion of the shaft 6 within the central opening of the pinion 9 is an elongated pin 11. This pin 11 has movement radially through the shaft 6 and upon forward rotation of the adjacent wheel W this pin 11 will engage with one of the internal ratchet teeth 10, as illustrated in Figure 3, to cause the shaft 6 to rotate with the pinion 9. However, upon reversed rotation of the wheel W the pin 11 will be ineffective.

The push bar B is positioned inwardly of but closely adjacent to one of the side plates 4 and the inner end of this bar B has rigidly secured, as at 12, to the outer side face thereof an end portion of a rigid arm 14. This arm extends a desired distance in advance of the adjacent end of the bar B and is pivotally connected, as at 15, to the adjacent end plate 4. Secured, as at 16, to the inside face of the inner or lower end of the bar B is a rigid arm 17 which extends toward the second plate 4 and terminates in a forwardly directed extension arm 18 pivotally connected, as at 19, with the second plate 4.

The pivotal connections 15 and 19, as clearly illustrated in Figure 1, are substantially in alignment so that the bar B may be readily raised or lowered as desired with respect to the plates 4.

The outer end of the bar B has securely fastened thereto a handle or hand grasp 20 extending outwardly and laterally from the bar B. Immediately adjacent to the handle or hand grasp 20 at a point inwardly thereof is a bearing 21 fixed to the bar B and which provides a mounting for a stub shaft 22. This shaft 22 carries for rotation therewith a sprocket wheel 23 of desired diameter and around which passes a sprocket chain 24. This chain 24 also passes around a sprocket wheel 25 freely mounted on the shaft 6. This sprocket wheel 25 is maintained in desired position upon the shaft 6 by thrust collars 26 fixed to the shaft 6 and coacting with the opposite ends of the hub 27 of the sprocket wheel 25. The bore of the hub 27 of the sprocket wheel 25 is also formed to provide therearound the internal ratchet teeth 28 with which coact a pin 29 slidably and radially disposed through the portion of the shaft 6 within the hub 27. By this arrangement the shaft 6 will be caused to rotate with the sprocket wheel 25 when said sprocket wheel is rotated in one direction but said sprocket wheel will be ineffective with respect to the shaft 6 when rotated in the opposite direction or when the sprocket wheel 25 is held against rotation.

The sprocket wheel 23 is provided with an operating handle or hand grasp 30 extending laterally therefrom in a direction opposite to that of the hand grasp or handle 20. This handle or hand grasp 30 may be used to advantage when pushing the mower and, of course, is also used to rotate the sprocket 23 when it is desired to manually operate the shaft 6 to further facilitate the desired operation of the mower.

The lower portions of the side plates 4 are each provided with a forwardly directed straight bracket arm 31. These bracket arms 31 provide supports for the elongated cutter bar 32 secured thereto in any desired manner as by the bolts 33. This cutter bar 32 is of a length to extend across the front of the machine proper and to a desired distance beyond one side thereof. As herein disclosed, this cutter bar 32 is disposed beyond the side of the machine proper at which the push bar B is positioned.

The extended portion of the cutter bar 32 has rigidly secured thereto, as at 34, at equidistantly spaced points therealong the conventional type of guard fingers 35 each of which has a fixed cutting knife 36 extending beyond opposite sides thereof. The bar 32 midway between each pair of adjacent guard fingers 35 is provided with an upstanding pin 37 which freely passes through an opening 38 in the rear end portion of a cutting blade 39 whereby said blade is held to the bar 32 for swinging movement in a direction lengthwise of said bar. The opposite or forward end portion of the blade is formed to provide a V-shaped cutting edge so that said blade may have proper coaction with the knives 36 carried by the adjacent guard fingers 35.

The intermediate portion of the blade 39 is provided with a buttonhole slot 40, the restricted portion of which is disposed toward the forward end of the blade.

The bolts 33 or the like, hereinbefore referred to, also hold to the bracket arms 31 the forwardly directed guide members 41 through which is slidably disposed an elongated reciprocating bar 42. This bar is of a length substantially equal to the length of the bar 32 and is positioned forwardly thereof. The bar 42 extends between the guards 35 and the blades 39 and is provided with the upstanding headed members 43, there being one of such members for each of the blades 39. The head of a member 43 readily passes through the inner or enlarged end of the slot 40 but cannot pass through the restricted portion of the slot. Therefore, in applying a blade 39 the head of the member 43 is first passed through the enlarged portion of the slot 40 whereupon the blade is moved rearwardly so that the same may be operatively engaged with its pivot pin 37. The bar 42 immediately adjacent to the pulley 7 has fixed thereto a bearing 44 in which is adjustably engaged a headed member 45 which extends within the cam groove 8 of the pulley 7.

As the shaft 6 is rotated either from the wheels W or by rotation of the sprocket wheel 23, the bar 42 will be caused to reciprocate to an extent to effect the desired rocking of the blades 39 for cutting coaction with the associated knives 36.

To assure the best cutting tension of the blades 39 with respect to the knives 36 there is disposed along and above the extended portion of the bar 32 an elongated tension plate 46. The forward marginal portion of the plate 46 is formed to have contact from above with the blades 39. At desired points therealong the extended portion of the bar 32 is provided with the upstanding members 47, each of which is freely disposed through a plate 46. Surrounding each of these members 47 and interposed between the bar 32 and the rear portion of the plate 46 is an expansible coil spring 48. The tension of the spring can be regulated by proper adjustment of the wing nut 49 threading upon the upper end portion of the member 47 above the plate 46. This spring 48 serves to urge the forward marginal portion of the plate 46 into desired contact with the blades 39.

A suitable shield 50 is positioned in advance of the machine proper to keep dirt and grass away from the moving parts of the machine. This shield 50 may be maintained in desired position in any manner preferred but, as herein disclosed, the substantially V-shaped brackets 51 are employed, the apex portion of each of which is suitably clamped to an extended end portion of the axle 1.

The members 15 and 19 also provide pivotal connections for the rearwardly disposed elongated straight arms 52 which rotatably support therebetween and at their outer or free end portions a trailer roller 53 which is employed to raise and lower the machine to the position desired during a cutting operation. One of these arms 52 has pivotally connected thereto, as at 54, an end portion of an elongated rod 55 which in turn is pivotally connected, as at 56, to the lower extremity of a lever 57. This lever 57 is pivoted intermediate its ends, as at 58, to the outer side of the bar B.

By proper manipulation of the lever 57 the trailer roller 53 may be raised or lowered. This lever 57 carries a conventional latch mechanism for coaction with the rack 59 for holding the trailer roller 53 in its desired adjustment.

From the foregoing description it is thought to be obvious that a lawn mower constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. In a lawn mower, the combination of an axle, ground engaging wheels mounted on said axle, end plates carried by the axle, one of said plates being positioned adjacent to each of the ground engaging wheels, a push bar connected to said end plates, a shaft rotatably supported by the lower forward portions of the end plates, driving connections between the shaft and the ground engaging wheels effective upon rotation of the ground engaging wheels in one direction and ineffective upon reverse rotation of said wheels, an elongated bar operatively supported by the end plates below but closely adjacent to the shaft, said bar extending outwardly beyond one of the ground engaging wheels, guards carried by the extended portion of said bar at points spaced therealong, cutting knives carried by said guards, a cutting blade positioned between each pair of adjacent guards for coaction with the cutting knives carried by the guards, means for pivotally connecting each of said blades with the bar, a second bar positioned in advance of the first named bar and closely adjacent thereto, means for pivotally connecting said second bar to all of the blades, coacting means carried by the shaft and the first named bar for reciprocating said second bar for oscillating the blades upon rotation of the shaft, and means common to all of the blades for imposing tension thereon with respect to the knives carried by the guards.

2. In a lawn mower, the combination of an axle, ground engaging wheels mounted on said axle, end plates carried by the axle, one of said plates being positioned adjacent to each of the ground engaging wheels, a push bar connected to said end plates, a shaft rotatably supported by the lower forward portions of the end plates, driving connections between the shaft and the ground engaging wheels effective upon rotation of the ground engaging wheels in one direction and ineffective upon reverse rotation of said wheels, an elongated bar operatively supported by the end plates below but closely adjacent to the shaft, said bar extending outwardly beyond one of the ground engaging wheels, guards carried by the extended portion of said bar at points spaced therealong, cutting knives carried by said guards, a cutting blade positioned between each pair of adjacent guards for coaction with the cutting knives carried by the guards, means for pivotally connecting each of said blades with the bar, a second bar positioned in advance of the first named bar and closely adjacent thereto, means for pivotally connecting said second bar to all of the blades, coacting means carried by the shaft and the first named bar for reciprocating said second bar for oscillating the blades upon rotation of the shaft, a member freely mounted on the shaft, coacting means carried by said member and the shaft to cause the same to rotate in unison in one direction but allowing independent rotation in the opposite direction, a rotatable member carried by the push bar, and a driving connection between the rotatable member on the push bar and the rotatable member on the shaft.

3. In a lawn mower, the combination of an axle, ground engaging wheels mounted on said axle, end plates carried by the axle, one of said plates being positioned adjacent to each of the ground engaging wheels, a push bar connected to said end plates, a shaft rotatably supported by the lower forward portions of the end plates, driving connections between the shaft and the ground engaging wheels effective upon rotation of the ground engaging wheels in one direction and ineffective upon reverse rotation of said wheels, an elongated bar operatively supported by the end plates below but closely adjacent to the shaft, said bar extending outwardly beyond one of the ground engaging wheels, guards carried by the extended portion of said bar at points spaced therealong, cutting knives carried by said guards, a cutting blade positioned between each pair of adjacent guards for coaction with the cutting knives carried by the guards, means for pivotally connecting each of said blades with the bar, a second bar positioned in advance of the first named bar and closely adjacent thereto, means for pivotally connecting said second bar to all of the blades, coacting means carried by the shaft and the first named bar for reciprocating said second bar for oscillating the blades upon rotation of the shaft, a member freely mounted on the shaft, coacting means carried by said member and the shaft to cause the same to rotate in unison in one direction but allowing independent rotation in the opposite direction, a rotatable member carried by the push bar, a driving connection between the rotatable member on the push bar and the rotatable member on the shaft, a laterally directed handle carried by the push bar and disposed in a direction away from the rotatable member on the push bar, and a laterally disposed handle member carried by the rotatable member on the push bar and disposed in a direction opposite to that of the handle member on the shaft, said handle member on the rotatable member providing means for rotating such member and also providing an additional bar to facilitate pushing on the push bar.

4. In a lawn mower, the combination of an axle, ground engaging wheels mounted on said axle, end plates carried by the axle, one of said plates being positioned adjacent to each of the ground engaging wheels, a push bar connected to said end plates, a shaft rotatably supported by the lower forward portions of the end plates, driving connections between the shaft and the ground engaging wheels effective upon rotation of the ground engaging wheels in one direction and ineffective upon reverse rotation of said wheels, an elongated bar operatively supported by the end plates below but closely adjacent to the shaft, said bar extending outwardly beyond one of the ground engaging wheels, guards carried by the extended portion of said bar at points spaced therealong, cutting knives carried by said guards, a cutting blade positioned between each pair of adjacent guards for coaction with the cutting knives carried by the guards, means for pivotally connecting each of said blades with the bar, a second bar positioned in advance of the first named bar and closely adjacent thereto, means for pivotally connecting said second bar to all of the blades, coacting means carried by the shaft and the first named bar for reciprocating said second bar for oscillating the blades upon rotation of the shaft, a member freely mounted on the shaft, coacting means carried by said member and the shaft to cause the same to rotate in unison in one direction but allowing independent rotation in the opposite direction, a rotatable member carried by the push bar, a driving connection between the rotatable member on the push bar and the rotatable member on the shaft, a laterally directed handle carried by the push bar and disposed in a direction away from the rotatable member on the push bar, and a laterally disposed handle member carried by the rotatable member on the push bar and disposed in a direction opposite to that of the handle member on the shaft, said handle member on the rotatable member providing means for rotating such member and also providing an additional bar to facilitate pushing on the push bar, the rotatable member on the push bar being in close proximity to the handle member carried by the push bar.

5. A grass cutting machine comprising, in combination, a wheel supported frame including ground engaging wheels, a push bar, an elongated bar carried by the frame and extending laterally beyond the side thereof, upstanding pins carried by said bar at points spaced therealong, cutting blades, each of said blades having an opening to receive an upstanding member of the bar whereby said blade is pivotally connected to the bar, each of the blades having a longitudinally disposed button-hole slot with the larger portion inwardly directed, a second bar common to all of the blades, headed members carried by said second bar there being one of said headed members for each of the blades, a head of a headed member being freely insertible through the enlarged portion of the slot of its associated blade but of a diameter greater than the width of the restricted portion of the blade, guards carried by the first bar and extending forwardly thereof, knives carried by the guards with which the blades coact, and coacting means carried by the frame and the second bar for reciprocating said bar to swing the blades with respect to the knives.

6. In a lawn mower, the combination of an axle, ground engaging wheels mounted on said axle, end plates carried by the axle, one of said plates being positioned adjacent to each of the ground engaging wheels, a push bar connected to said end plates, a shaft rotatably supported by the lower forward portions of the end plates, driving connections between the shaft and the ground engaging wheels effective upon rotation of the ground engaging wheels in one direction and ineffective upon reverse rotation of said wheels, an elongated bar operatively supported by the end plates below but closely adjacent to the shaft, said bar extending outwardly beyond one of the ground engaging wheels, guards carried by the extended portion of said bar at points spaced therealong, cutting knives carried by said guards, a cutting blade positioned between each pair of adjacent guards for coaction with the cutting knives carried by the guards, means for pivotally connecting each of said blades with the bar, a second bar positioned in advance of the first named bar and closely adjacent thereto, means for pivotally connecting said second bar to all of the blades, coacting means carried by the shaft and the first named bar for reciprocating said second bar for oscillating the blades upon rotation of the shaft, a trailer roller, rigid members with which said roller is engaged, means for pivotally connecting said members with the end plates so that the roller may be raised or lowered, and means carried by the push bar and coacting with one of the rigid members for raising and lowering the roller.

7. In a lawn mower, the combination of an axle, ground engaging wheels mounted on said axle, end plates carried by the axle, one of said end plates being positioned adjacent each of the ground engaging wheels, a push bar connected to said end plates, a shaft rotatably supported by the lower forward portions of the end plates, driving connections between the shaft and the ground engaging wheels, an elongated bar operatively supported by the end plates below the shaft and extending outwardly beyond one of the ground engaging wheels, guards carried by the extended portion of said bar at points spaced therealong, oscillating cutting knives pivotally engaged with the bar, a cutting blade being positioned between each pair of adjacent guards, a second bar positioned in advance of but closely adjacent to the first named bar, means for pivotally connecting the second bar with each of the oscillating blades, a pulley mounted on the shaft for rotation therewith and provided in its periphery with a continuous cam groove extending around the pulley at a desired angle with respect to the axis of the pulley, and a part mounted upon and supported entirely by the second bar and extending within the cam groove of the pulley to reciprocate the second bar to oscillate the blades upon rotation of the pulley.

HANS ELLINGSON.
OSCAR L. BARNES.